US008770220B1

(12) United States Patent
Embry

(10) Patent No.: US 8,770,220 B1

(45) Date of Patent: Jul. 8, 2014

(54) HYDRANT LOCK

(76) Inventor: King Embry, Winnetka, IL (US)

( * ) Notice: Subject to any disclaimer, the term of this patent is extended or adjusted under 35 U.S.C. 154(b) by 1 day.

(21) Appl. No.: 13/475,546

(22) Filed: May 18, 2012

Related U.S. Application Data

(63) Continuation-in-part of application No. 12/761,814, filed on Apr. 16, 2010, now Pat. No. 8,353,309.

(51) Int. Cl.
*F16K 35/06* (2006.01)
*G05G 5/28* (2006.01)

(52) U.S. Cl.
USPC .............. 137/385; 137/382; 70/180; 220/210

(58) Field of Classification Search
USPC ............ 137/382–385; 70/174–180, 158, 163, 70/164, 229–232; 220/210
See application file for complete search history.

(56) References Cited

U.S. PATENT DOCUMENTS 1,947,081 A 2/1934 Grady et al.
3,185,336 A 5/1965 Goss
3,391,554 A * 7/1968 Wrenshall ....................... 70/178
3,448,762 A * 6/1969 Schmitt ......................... 137/383
3,593,549 A * 7/1971 Lakins et al. ................... 70/164
4,620,428 A 11/1986 Kopesky
4,690,167 A * 9/1987 Skipper ......................... 137/382
4,723,569 A 2/1988 Ellis
5,201,201 A * 4/1993 Sylvester et al. ............... 70/165
5,238,141 A 8/1993 Callegari et al.
5,464,114 A 11/1995 Green
5,632,301 A 5/1997 Julicher
5,823,023 A * 10/1998 Benda ............................ 70/180
6,463,953 B1 10/2002 Cuzzo et al.
6,612,455 B2 9/2003 Byrne
6,691,732 B2 2/2004 Fleury, Jr. et al.
6,802,338 B1 10/2004 Istre, Jr.
6,816,072 B2 11/2004 Zoratti
6,994,106 B1 * 2/2006 Hackley et al. ............... 137/385
7,084,809 B2 8/2006 Hockley, Jr. et al.
7,113,124 B2 9/2006 Waite
7,508,840 B2 3/2009 Delaney
7,597,113 B2 10/2009 Garcia et al.
8,286,829 B2 * 10/2012 DeMent ........................ 220/833
2004/0129312 A1 7/2004 Cuzzo et al.
2005/0104747 A1 5/2005 Silic et al.
2005/0265256 A1 12/2005 Delaney
2009/0116509 A1 5/2009 Delaney
2009/0174547 A1 7/2009 Greene et al.
2009/0198384 A1 8/2009 Ahn
2009/0207852 A1 8/2009 Greene et al.

FOREIGN PATENT DOCUMENTS

JP 08299030 5/1998

* cited by examiner

*Primary Examiner* — John K Fristoe, Jr.
*Assistant Examiner* — Daphne M Barry
(74) *Attorney, Agent, or Firm* — Middleton Reutlinger; Chad D. Bruggeman; John F. Salazar

(57) ABSTRACT

A hydrant locking device inhibiting unauthorized operation of a fire hydrant. The hydrant locking device includes a housing rotatably engaging an extension. The extension includes a rotatable staple extending through the housing. A locking device may engage the rotatable staple. The housing may also include one or more markers on a surface thereof.

13 Claims, 8 Drawing Sheets

110 8 R2 83 82 87a 3 84 87 80 8 87b 85 86 A R1 70 72 144 71 71a 46 142 140 41 45 41a 41 41a 41 2 1

HYDRANT LOCK

CROSS-REFERENCE TO PRIOR APPLICATION

This is a continuation-in-part of, currently pending, U.S. patent application Ser. No. 12/761,814, filed on Apr. 16, 2010, which is incorporated herein by reference.

TECHNICAL FIELD

The present invention relates to a locking device and particularly to a hydrant locking device to inhibit unauthorized operation of a fire hydrant.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
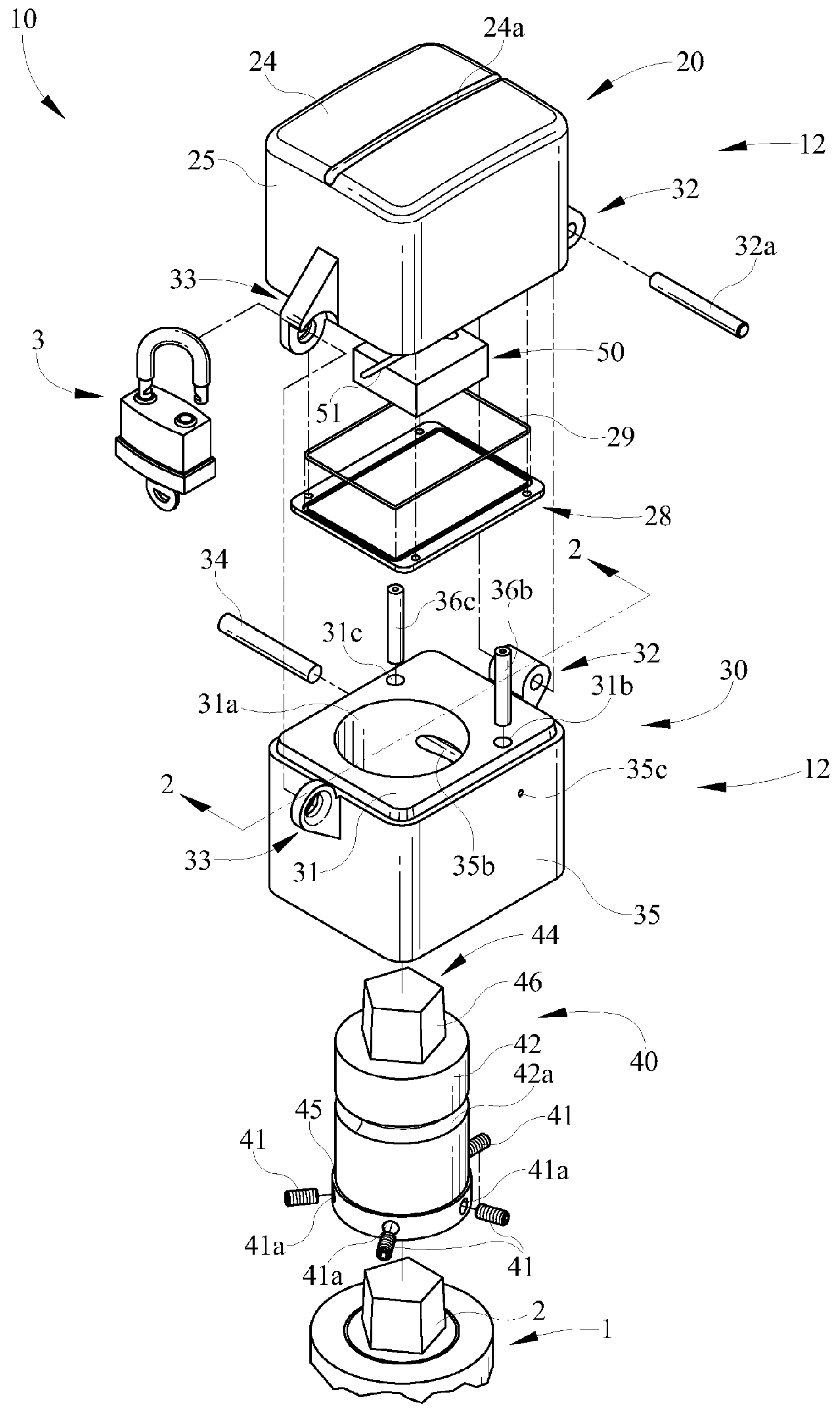
FIG. 1 is an exploded, perspective view of one embodiment of the hydrant locking device exploded away from the hydrant operating nut of the fire hydrant with portions of the fire hydrant broken away.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

As shown in FIGS. 1-5, one embodiment of a hydrant locking device 10 inhibits unauthorized operation of a fire hydrant 1. Fire hydrant 1 includes an actuating or operating nut 2 positioned at an upper end of the fire hydrant. Previous locking devices are designed to mount on a hydrant's operating nut only to secure an individual hydrant from unauthorized use by preventing access to the operating nut. If the previous locking device is breached, only a physical inspection of the hydrant would determine that tampering has occurred. The present embodiments provide, but is not limited to, a lockable housing to identify tampering and prevent unauthorized use of the fire hydrant, hands free operation of the operating nut when the housing is in an open configuration, and electronics to allow the sensing and/or the transmitting of a variety of information, such as but not limited to unauthorized use, to a remote location or internally within the housing of the hydrant locking device.

Figure 4:
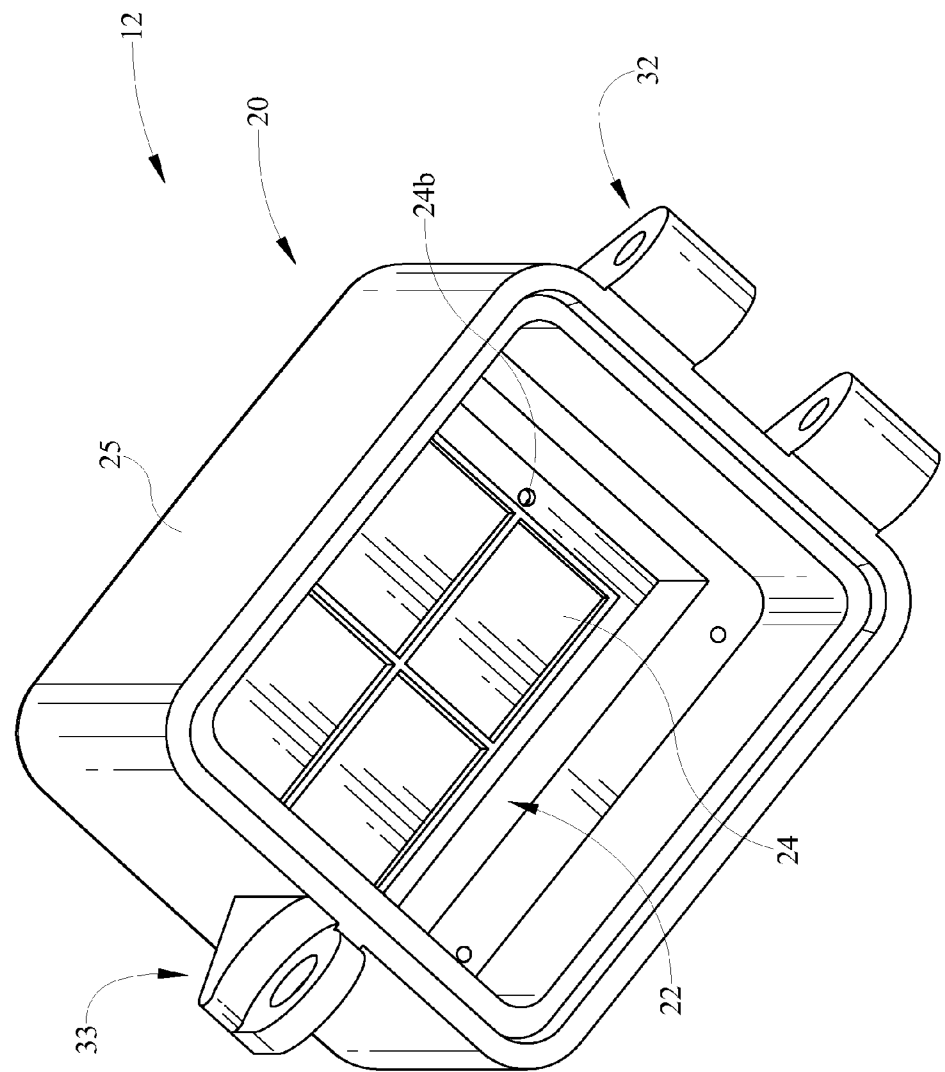
FIG. 4 is a bottom perspective view of the flip-top lid of the locking device embodiment of FIG. 1.
Figure 5:
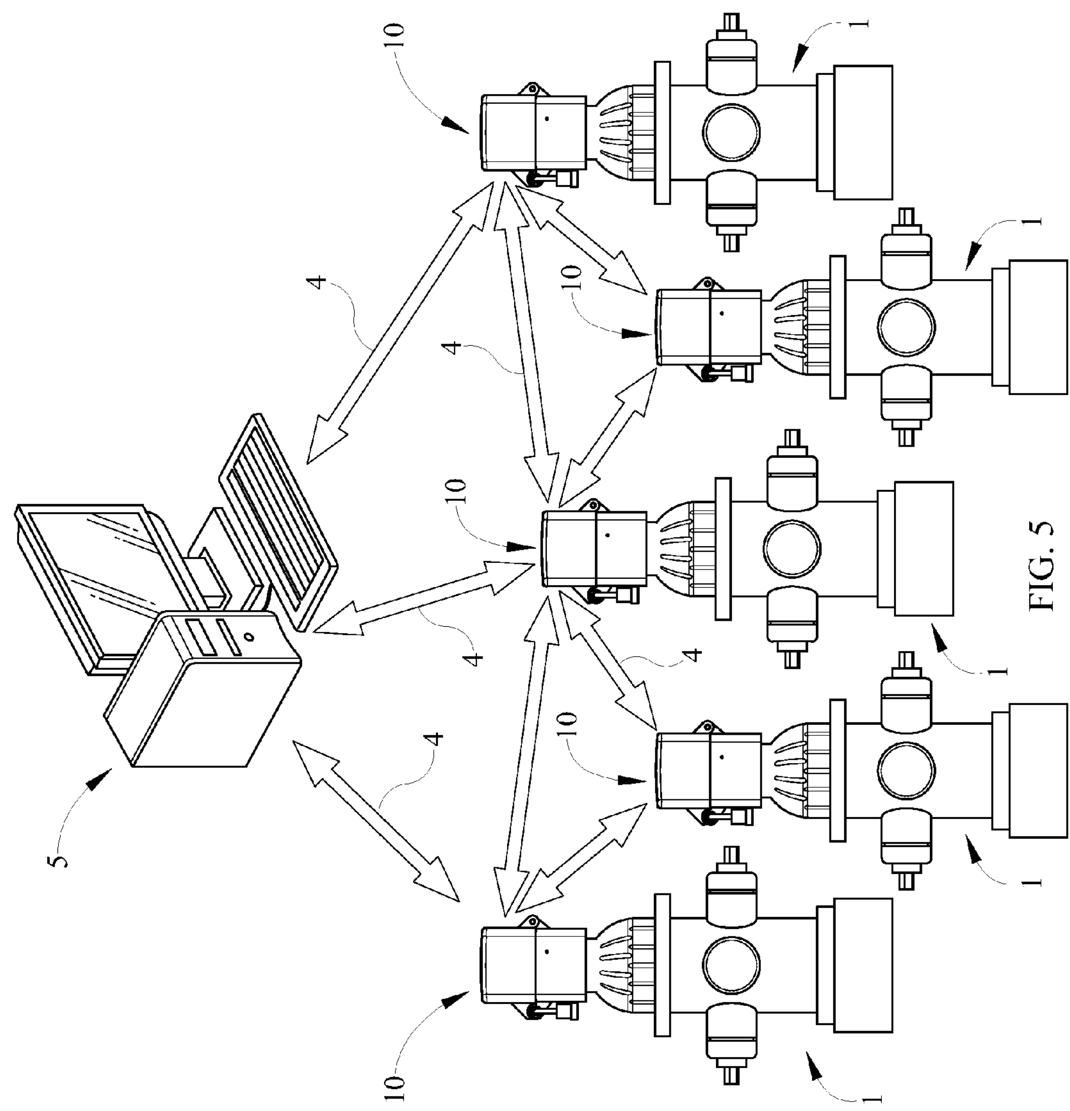
FIG. 5 is an illustration of a hydrant network system with the locking device embodiment of FIG. 1 as the nodes making up the mesh network.

As shown in FIGS. 1-5, a flip-top housing 12 of the hydrant locking device 10 engages a fire hydrant 1 or more specifically the operating nut 2 of the fire hydrant. Flip-top housing 12 includes a housing base or body portion 30 and a lid or cover 20. Housing 12 may be made of a variety of materials including but not limited to cast iron or ductile iron. Lid 20 is hingedly connected to base 30. A hinge 32 accommodates movement of lid 20 from a closed position (FIG. 5) to an open position (FIG. 2) about hinge pin **32*a* while maintaining the attachment of lid 20 to base 30. Hinge 32 may allow for the opening of lid 20 by a variety of means known in the art including but not limited to a two piece flip-top housing. Hinge 32 may also be bimodal wherein the hinge snaps lid 20 to either a fully open position (FIG. 2) or a fully closed position (FIG. 5). Alternatively, the hinge can be a living hinge type. A padlock hasp 33 may be positioned opposite hinge 32 to receive a padlock or locking device 3 to lock the flip-top housing 12 in its closed position (FIG. 5). Hasp 33** receives padlocks with a full U-shaped shackle or a high security padlock with shrouded shackle. The hasp design has minimal material exposed to limit an unauthorized user's ability to cut it with bolt cutters or a hack saw.

Figure 2:
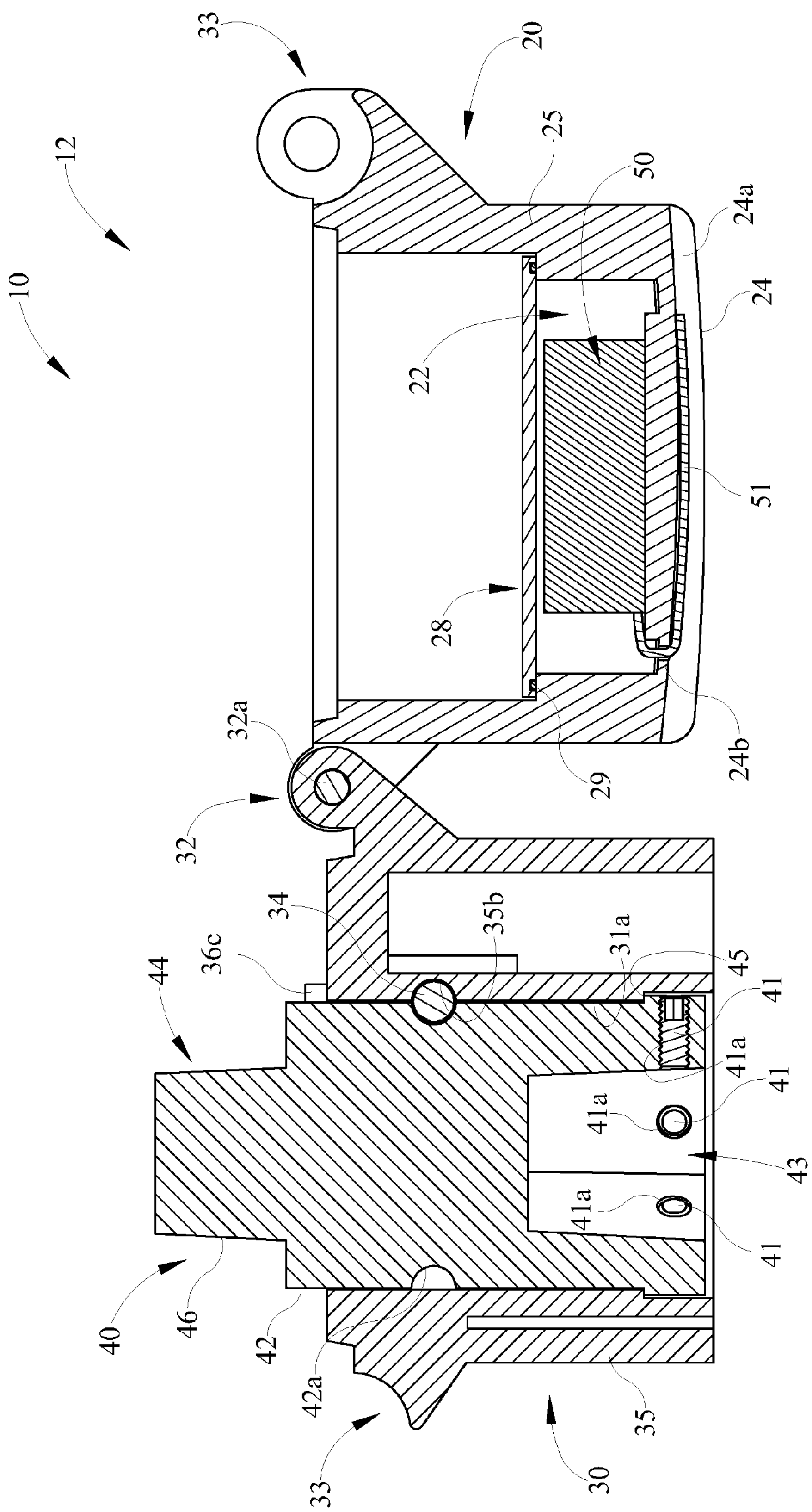
FIG. 2 is a sectional view of the embodiment of FIG. 1 in an open configuration taken along line 2-2.
Figure 3:
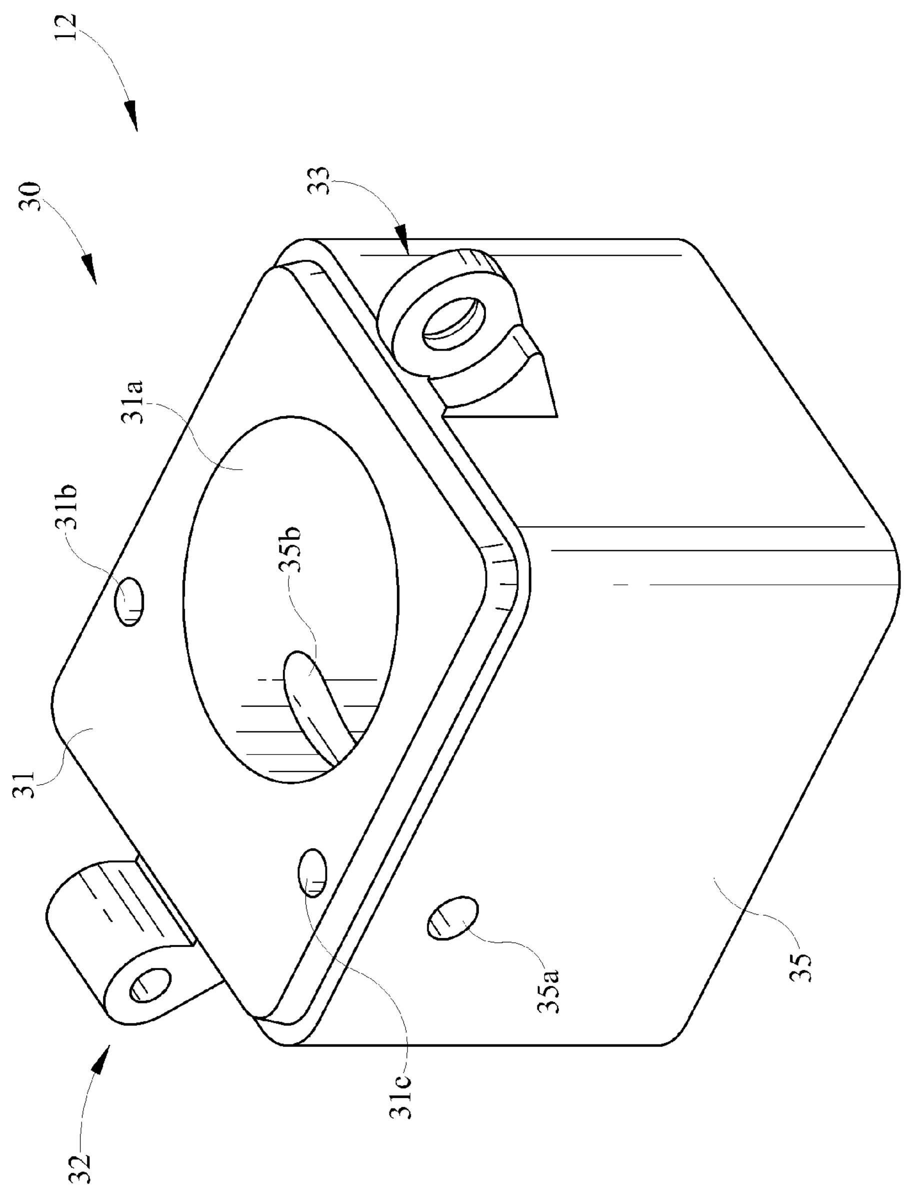
FIG. 3 is a top perspective view of the base of the locking device embodiment of FIG. 1.

As shown in FIGS. 1 and 2, an extension 40 has a cylindrical shaped body formed with a downward facing, inner opening 43. Extension 40 may be made of a variety of materials including but not limited to cast iron or ductile iron. Inner opening 43 is pentagonal in shape and includes five sides matching the shape of the fire hydrant operating nut 2. It should be understood that fire hydrants 1 may have a variety of different shaped operating nuts 2, such as but not limited to square shaped, and thus the extension 40 can be shaped accordingly to a complementary shape matching the hydrant operating nut. The upper end of extension 40 includes a pentagonal shape actuator nut 44 having slightly inward tapering sides 46. In a cylindrical sidewall 42 of extension 40 is a horizontally positioned, arcuate shaped groove **42*a*. Below this groove 42*a* is a set of radially spaced apart, horizontally positioned threaded bores 41*a*. Extension 40 may have up to five bores 41*a* or an amount equal to the number of sides defining the extension inner opening 43. Bores 41*a* intersect respectively with the extension inner opening's sides at their midpoints. Disposed in each threaded bore 41*a* is a set screw 41. In use, hydrant operating nut 2 is received into inner opening 43 of extension 40, thereby set screws 41** are tightened into a compressive engagement against the sides of the hydrant operating nut.

As shown in FIGS. 1-3 and 5, closure base 30 may be characterized as having or defining a wall or skirt 35 for removably (FIGS. 1 and 2) or non-removably (not shown) receiving extension 40 or fire hydrant 1. Skirt 35 depends downwardly from a top wall 31. Top wall 31 includes a cylindrical shaped, inner opening 31*a*. Inner opening 31*a* is sized to receive extension 40 and allows longitudinal movement between the extension 40 and the housing base 30 while limiting lateral movement. Base 30 is fitted onto and rests on a shoulder 45 at the lower end of the extension 40. As now located, base skirt opening 35*a* is aligned with the extension groove 42*a*. Base 30 is then secured to extension 40 by a locking pin 34 extending through base skirt opening 35*a* of skirt 35 and engaging extension groove 42*a*, thereby allowing rotation of the flip-top housing 12 but preventing axial movement. Specifically, base skirt opening 35*a* intersects tangentially with base inner opening 31*a* to form a horizontally positioned, arcuate shaped slot 35*b* in the sidewall of the inner opening 31*a* to receive locking pin 34. Further, one or more vertical openings 31*b* and 31*c* are positioned perpendicularly to base top wall 31 and through base skirt opening 35*a*. Installation of locking pin 34 may include a first stop pin 36*b* inserted into vertical opening 31*b* opposite the entry to the base skirt opening 35*a*. Next, locking pin 34 is horizontal inserted into opening 35*a* of base skirt 35 until locking pin 34 abuts against the previously inserted first stop pin 36*b*. Finally, the user inserts the second stop pin 36*c* into opening 31*c* at the other end of the previously inserted locking pin 34. In the locked positioned, locking pin 34 extends through base skirt opening 35*a* and extension groove 42*a* with a stop pin 36*b* and 36*c* vertically positioned in each of the vertical openings 31*b* and 31*c*, respectively, of base top wall 31 at opposing ends of the locking pin preventing lateral removal of the locking pin 34. To remove locking pin 34, the user would remove both stop pins 36*b* and 36*c* and push out locking pin 34 when lid 20 is in the open position (FIG. 2). Locking pin 34 may be pushed out of base 30 with a nail or small screw driver through a small hole or opening 35*c* through skirt 35 at the axial end of the base skirt opening 35*a*. However, it should be understood that the stop pins 36*b* and 36*c* could be used to push out locking pin 34 if the base skirt opening 35*a* extended continuously through the base skirt. The locking pin 34 and stop pins 36*b* and 36*c* may be made of a variety of materials including but not limited to stainless steel. For instance, stop pins 36*b* and 36*c* may be standard hex key wrenches (Allen Wrenches) that can also be used to tighten the set screws 41 into the compressive engagement against the sides of the hydrant operating nut 2 to secure the extension 40. Although the engagement between housing base 30 and extension 40 is shown in detail in FIGS. 1, 2, and 3, it is merely representative of engagements in general, and it is to be understood that there are a variety of attachment mechanisms that may be used with the housing 12 herein. For example, a C-shaped locking pin may slide into two horizontal openings of the base skirt and engage the extension groove at two positions 180 degrees apart while still allowing rotation of the housing and preventing axial movement of the housing.

Figure 6:
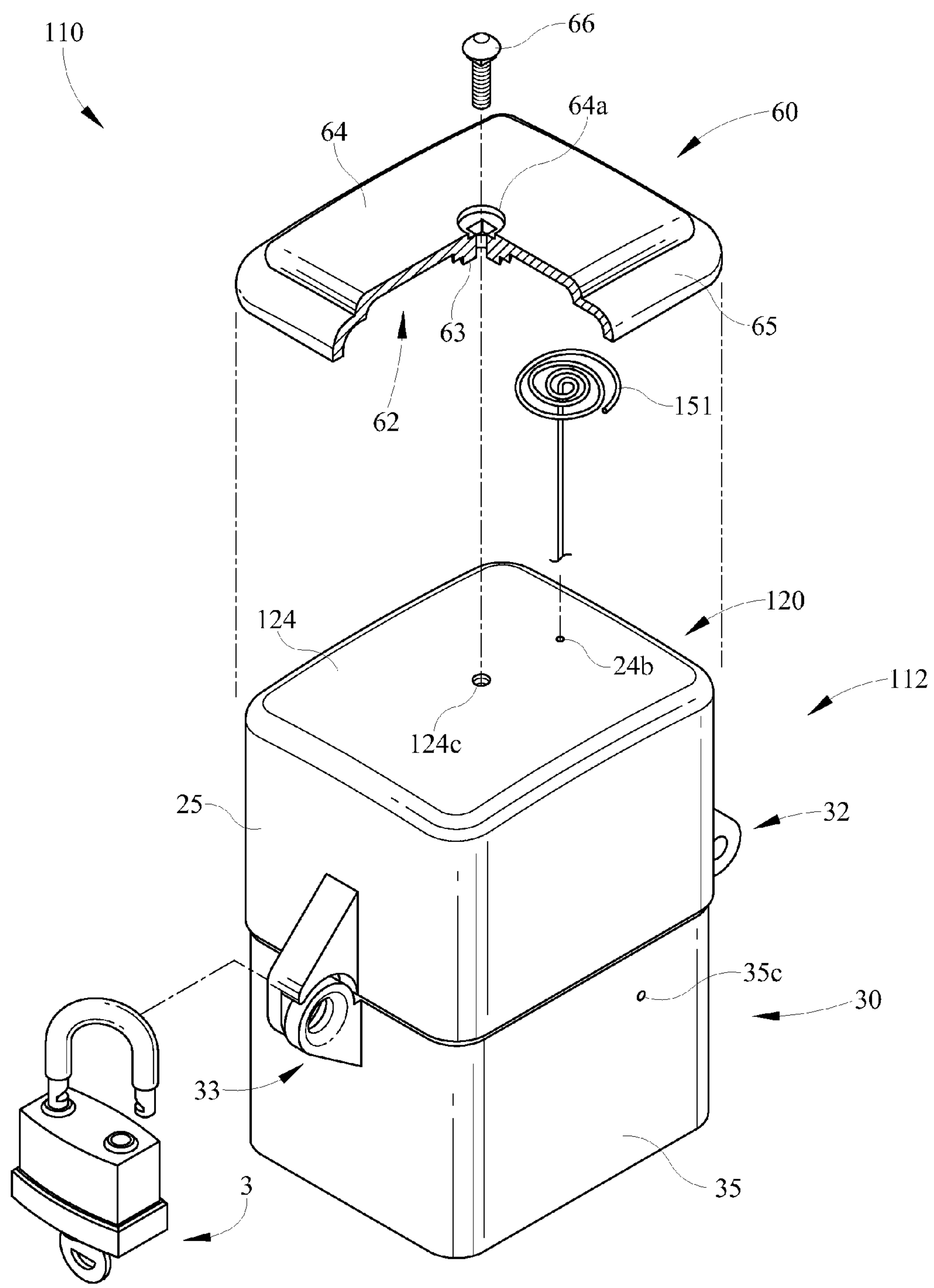
FIG. 6 is an exploded, perspective view of another embodiment of a locking device with a cover and an aerial wire exploded away therefrom and portions of the cover broken away.

As shown in FIGS. 1, 2, and 4, hinged lid 20 may include one or more cavities 22 to hold a variety of devices such as, but is not limited to, one or more electronics 50. Lid 20 includes a top wall 24 with a depending skirt or wall 25 defining at least one cavity 22. Cavity 22 may include a variety of electronics 50 including but not limited to transmitters, accelerometers, transceivers, alarms such as audible and/or visual, sensors, or combinations thereof. A cover plate 28 and gasket 29 may seal cavity 22 and create a sealed compartment sealing the electronics 50 or other devices within flip-top housing 12. Although, gasket 29 and cover plate 28 may be used to seal cavity 22 from water, dirt, or other such undesirable elements, it should be understood that a variety of other sealing methods may be used such as, but not limited to, sealed or water proof electronics or the entire cavity 22 being filled or encapsulated with a sealant material. Top wall 24 may include a groove 24*a* that may contain an aerial wire 51 extending from cavity 22 through an opening 24*b* of lid top wall 24. As shown in FIG. 6, the top wall of the lid may be without a groove. A sealant or other material (not shown) may also be used to seal opening 24*b*, seal about aerial wire 51 in opening 24*b*, maintain the position of aerial wire 51 within top wall groove 24*a*, or combinations thereof. In use, a transmitter of electronics 50 will be activated when the lockable lid 20 of housing 12 is opened (FIG. 2) and/or via a separate sensor, for example for nuclear materials, water pressure, water temperature, chemicals, etc. Further, a visual and/or audible alarm may be activated and be emitted directly or indirectly from the hydrant locking device 10 when the lockable lid 20 of housing 12 is opened past a predetermined position or angle. It is further understood, that the flip-top housing 12 may be used initially to lockably inhibit unauthorized operation of the fire hydrant without electronics 50 installed and allow a user to add electronics 50 or other devices later if desired within the lid cavity 22.

As shown in FIG. 5, each flip-top housing 12 may include electronics 50 to allow for a "mesh based sensor network" utilizing fire hydrants 1 for the placement of network nodes. A wireless mesh network (WMN) is a communications network made up of radio nodes organized in a mesh topology. Wireless mesh networks often consist of mesh clients, mesh routers and gateways. The mesh clients are often laptops/computers 5, cell phones and other wireless devices while the mesh routers forward traffic to and from the gateways which may but need not connect to the Internet. The coverage area of the radio nodes working as a single network is sometimes called a mesh cloud. Access to this mesh cloud is dependent on radio nodes or the hydrant locking devices 10 working in harmony with each other to create a radio network. A mesh network is reliable and offers redundancy. When one node can no longer operate, the rest of the nodes can still communicate 4 with each other, directly or through one or more intermediate nodes. Wireless mesh networks can be implemented with various wireless technology including 2.4, 802.11, 802.16, cellular technologies or combinations of more than one type. This "Hydrant Network System" includes fire hydrant mounted nodes or hydrant locking devices 10 that make up the mesh network "cloud". The placement of hydrant locking devices 10 with each fire hydrant 1 throughout a water district provides an ideal topography with the average distance of 300 to 600 feet between hydrants in most metropolitan areas. The Hydrant Network System and associated sensors are monitored from a PC based application that presents a "dashboard" showing the real time status of all sensors connected to the "Hydrant Based Network". For example in use, an accelerometer within housing lid electronics 50 in locking device 10 communicates 4 in the mesh network system to signal that unauthorized use has occurred when a lid 20 pivots to a predetermined angle about hinge 32 relative to base 30.

As shown in FIG. 2, the flip-top lid 20 or base 30 of the flip-top housing 12 does not have to be completely removed from fire hydrant 1 or extension 40 to operate the hydrant nut 2 of the fire hydrant 1. The lid 20 is opened upon unlocking the lid or removing the padlock 3 from the hasp 33. Once the lid is opened to, but is not limited to, 180 degrees this allows the user full access to extension 40 or hydrant operating nut 2 with a hydrant wrench or other tool to operate the hydrant and allows the user hands free operation of the hydrant operating nut. Additionally when lid 20 is in the open position (FIG. 2), the sealed or unsealed cavity 22 is accessible to operate, replace, add, or repair electronics or other devices contained therein. Also, the locking pin 34 that is releasably securing the base 30 or housing 12 to the fire hydrant 1 or extension 40 is accessible when the lid 20 is in the open position (FIG. 2). Therefore, any unauthorized user is unable to operate the hydrant, access the electronics, and to remove the locking pin or base from the hydrant when the lid is in a locked closed position (FIG. 5).

As shown in FIG. 6, another embodiment of a locking device 110 includes a flip-top housing 112 having a lid 120 hingedly connected to base 30 as described above. However, lid 120 may include a cover 60 attached thereto. Cover 60 includes a top wall 64 with an outer depending skirt 65, whereby the skirt conforms to the outer periphery or exterior surface of the top wall 124 or lid 120. Cover 60 may be made of a variety of materials including but not limited to plastic, that may be injected or compression molded. When connected to the lid 120, cover 60 creates a compartment 62, sealed or unsealed, that may include, but is not limited to, an aerial wire 151 or other electrical devices. Cover 60 permits an aerial wire 151 of various sizes or configurations depending on the particular transmitter device selected. A carriage bolt 66 and nut (not shown) combination may connect the cover to the lid, however, it should be understood that other attachment mechanisms may be used such as, but not limited to, adhesives or other mechanical attachments. Carriage bolt 66 extends through the lid through opening 124*c* and engages the internally positioned nut (not shown). A spacer or projection 63 may depend from top wall 64 of cover 60 to maintain the compartment 62 size or spacing between cover 60 and lid top wall 124 to reduce depression of the cover caused from overtightening of the carriage bolt 66. Spacer 63 is shown as being adjacent to and surrounding the opening 64*a* that receives carriage bolt 66. Also, it should be understood that the cover 60 may be a variety of sizes, construction, shapes, quantities, and positions in relationship with its engagement with the lid or base.

Figure 7:
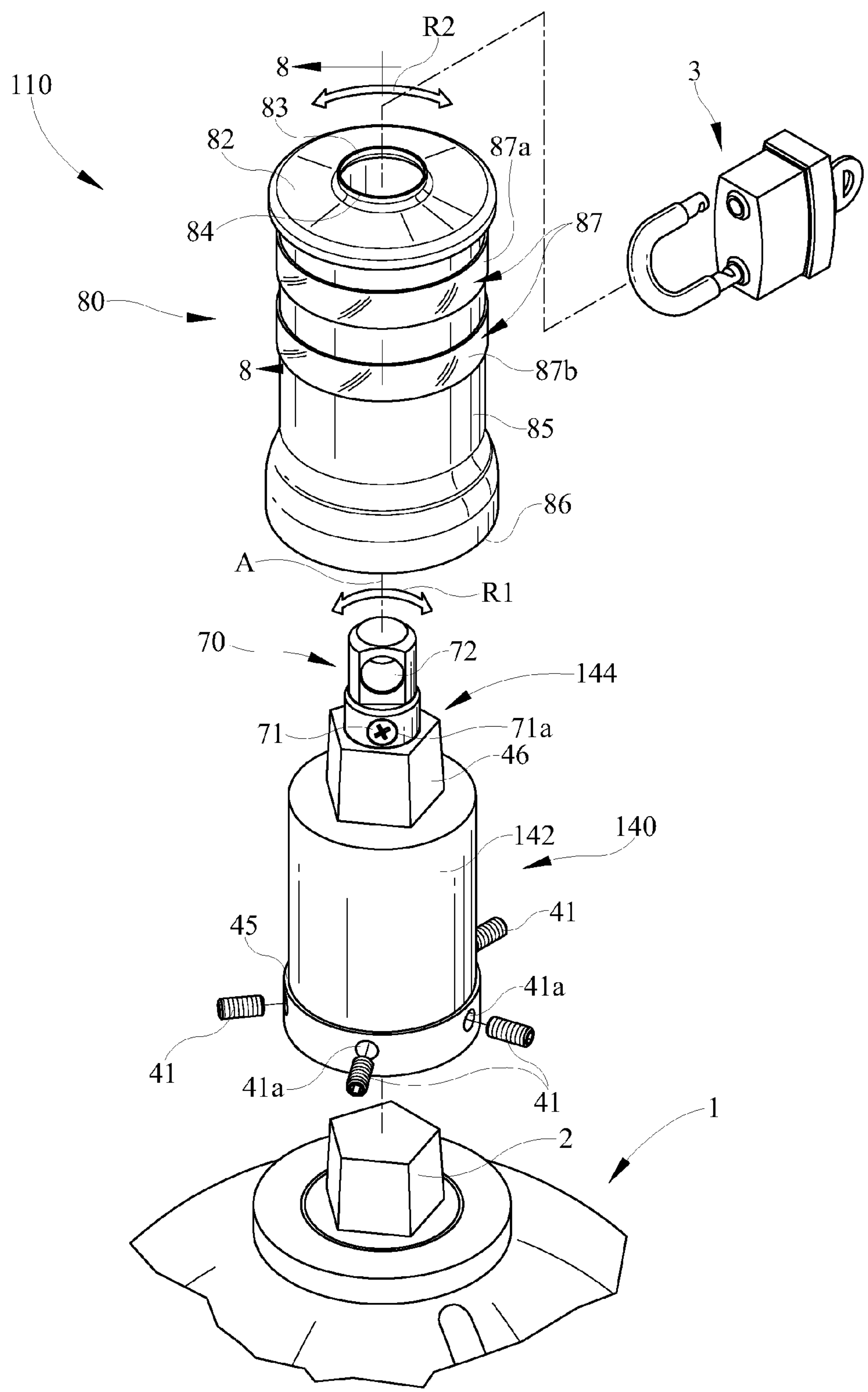
FIG. 7 is an exploded, perspective view of another embodiment of a hydrant locking device exploded away from the hydrant operating nut of the fire hydrant with portions of the fire hydrant broken away.
Figure 8:
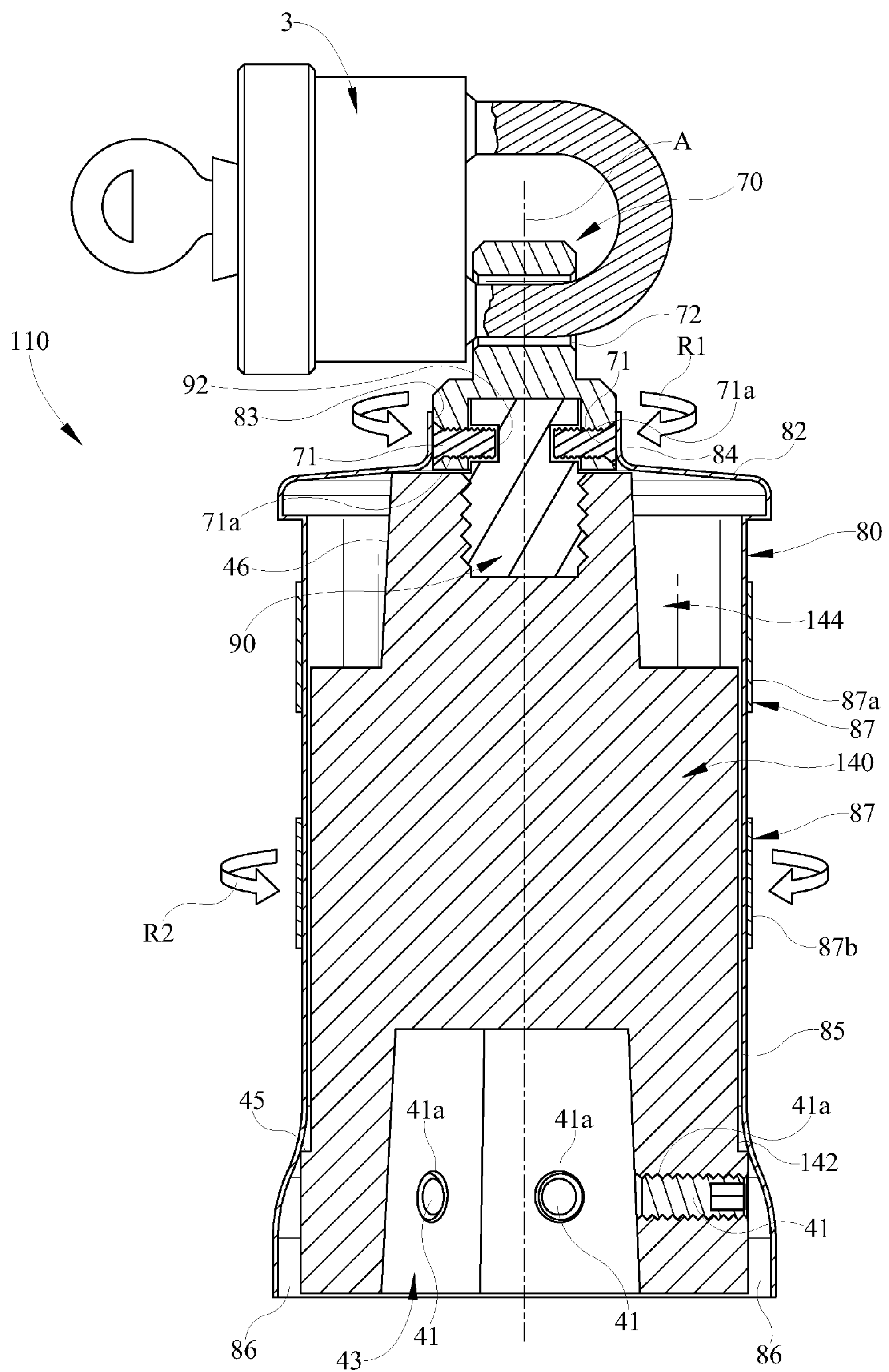
FIG. 8 is a sectional view of the assembled locking device embodiment of FIG. 7 taken along line 8-8 in a locked configuration.

As shown in FIGS. 7 and 8, another embodiment of a hydrant locking device 110 engages the operating nut 2 of the fire hydrant 1 to, but is not limited to, identify tampering and prevent unauthorized use of the fire hydrant 1. A housing or cap 80 of the hydrant locking device 110 is generally cylindrical in shape and includes a top wall 82 with a depending cylindrical skirt 85. Housing 80 may be made of a variety of materials including but not limited to cast iron, ductile iron, or steel that may be powder painted for increased durability. Top wall 82 at the upper end of housing 80 is substantially planar and includes a top opening 83 therethrough. The top wall 82 may also have a cylindrical neck portion 84 extending upwardly therefrom further defining the top opening 83. Top opening 83 is shown as being aligned along a longitudinal axis A of the housing 80 extending between the upper end and the lower end. At the lower end of the housing 80, the distal free end of cylindrical skirt 85 defines a downwardly facing bottom opening 86. When assembled, the housing inner surfaces of the top wall 82 and the cylindrical skirt 85 generally contour to the outer surfaces of the extension 140 while still allowing rotation of the housing 80 in relation to the extension 140, generally indicated by reference R2, about the longitudinal axis A. Also, it should be understood that the housing 80 may be a variety of sizes, constructions, shapes, quantities, and positions in relationship with its engagement with the extension 140 or hydrant 1 and still be within the scope of the teachings herein. For example, housing 80 may be a variety of heights or longitudinal lengths and may be substantially straight sided.

As shown in FIGS. 7 and 8, extension 140 has a substantially cylindrical shaped body 142. Extension 140 may be made of a variety of materials including but not limited to cast iron or ductile iron that may be powder painted for increased durability. The upper end of extension 40 includes a pentagonal shape actuator nut or first connector 144 having slightly inward tapering sides 46. The lower end of the extension 140, includes a downward facing, inner opening or second connector 43 that is pentagonal in shape and includes five sides matching the shape of the fire hydrant operating nut 2. It should be understood that fire hydrants 1 may have a variety of different shaped operating nuts 2, such as but not limited to square shaped, and thus the extension 140 can be shaped accordingly to a complementary shape matching the hydrant operating nut 2. Proximate the extension lower end is a set of radially spaced apart, horizontally positioned threaded bores 41*a*. Extension 140 may have up to five bores 41*a* or an amount equal to the number of sides defining the extension inner opening 43. Bores 41*a* intersect respectively with the extension inner opening's sides at their midpoints. Disposed in each threaded bore 41*a* is a set screw 41. In use, hydrant operating nut 2 is received into inner opening 43 of extension 140, thereby set screws 41 are tightened into a compressive engagement against the sides of the hydrant operating nut. Also, it should be understood that the extension 140 may be a variety of sizes, construction, shapes, quantities, and positions in relationship with its engagement with the housing 80 or hydrant 1 and still be within the scope of the teachings herein. For example, the extension 140 may be a variety of heights or longitudinal lengths and may be substantially straight sided.

As illustrated in FIGS. 7 and 8, the upper end of the extension 140 includes a rotatable staple or staple post 70 extending upwardly therefrom. Staple post 70 may be made of, but not limited to, stainless steel. Staple post 70 rotates, generally indicated by reference R1, relative to extension 140 about a rotational axis. When assembled, the staple post 70 rotates relative to both extension 140 and housing 80. Although it is contemplated that the rotational axis may be of a variety of positions and orientations relative to the extension 140 or housing 80, the rotational axis is shown as coaxially aligned with the longitudinal axis A extending from the upper end to the lower end of the extension 140. Staple post 70 includes an aperture 72 therethrough, wherein aperture 72 extends perpendicular to the longitudinal axis A or rotational axis of the staple post. One or more set screws 71 of the staple post 70 extend radially inward within a threaded bore 71*a* and inserts into a circumferential groove 92 of an upwardly extending pin 90 fixed relative to the extension 140. The set screws 71 form an interference fit with the pin groove 92 permitting rotation of the staple post 70 relative to the pin 90 and extension 140 while limiting axial movement therebetween. Although the pin 90 is shown as releasably secured or threaded to extension 140, pin 90 may be fixed to the extension 140. For instance, the pin 90 may be welded or integrally formed with the extension 140 to fixedly secure pin 90 to extension 140 and still allow the staple post 70 to rotate. Although the staple post 70 is shown in detail as extending from a top surface of the actuator nut 144 it should be understood that the staple post 70 may be of a variety of quantities, shapes, sizes, constructions, positions relative to the extension, and orientations and still rotate relative to the extension 140 and the housing 80.

In use, hydrant operating nut 2 is inserted into the inner opening 43 of the extension 140 and the set screws 41 are compressed against the hydrant operating nut 2. Housing 80 is disposed on extension 140 such that the staple post 70 extends at least partially through top opening 83 of the housing 80. Housing 80 is fitted onto and may rest on, but is not limited to, a shoulder 45 at the lower end of the extension 140. Further, the inner surface of the top wall may also longitudinal rest upon the extension or more specifically the actuator nut 22. Once the housing 80 is assembled with the extension 140, the staple post aperture 72 may then receive the locking device 3 creating a locked configuration (FIG. 8). The locking device 3 is shown as a padlock with a U-shaped shackle inserted through the aperture 72. As a result of assembling locking device 3, an interference engagement is created that prevents relative longitudinal movement between the housing 80 and the extension 140. Further when assembled, staple post 70 and housing 80 are allowed to independently rotate R1 and R2, respectively, about their longitudinal or respective axis A. It should also be understood that the locking device 3 rotates with the staple post 70. When assembled and in the locked configuration (FIG. 8), housing 80 has limited axial movement relative to extension 140. As a result the staple post set screws 71 and the set screws 41 engaging the hydrant operating nut 2 are inaccessible to an unauthorized user without first unlocking, removing, destroying, or altering the interference or tamper indicating seal created by the locking device 3.

To open the hydrant locking device 110, the user unlocks the locking device 3 allowing removal of the padlock from the staple post aperture 72 creating an unlocked configuration. In the unlocked configuration, the housing 80 can be moved vertically up from and away from the extension 140. This provides access to the extension 140 and to its actuator nut 144. Using a tool, the actuator nut 144 may be turned and accordingly turns the hydrant operating nut 2, since the actuator nut 144 is fixed to the hydrant operating nut 2. Upon completion of the use of the hydrant 1, the housing 80 may be axial returned upon the extension 140 and the locking device 3 again secured.

Although the locking device 3 is shown in detail as a padlock, it should be understood to those skilled in the art that the locking device may be of a variety of sizes, shapes, quantities, and constructions which may be used and still be within the scope of the teachings herein. For example, the locking device 3 may be of a variety of tamper evident seals or devices that may be used to prevent unauthorized water usage and indicate unauthorized use of the hydrant.

The hydrant locking device 110, or more specifically the outer periphery of the housing 80, may also include one or more markers 87 as a visual or audible indicator to a user as shown in FIGS. 7 and 8. Markers 87 are shown as a circumferential band surrounding the circumference of the housing skirt 85. Markers 87 may be made of a variety of materials including but not limited to an adhesive tape, electronics such as a light source, paint, or combinations thereof. Markers may extend 360 degrees, or portions thereof, around the housing 80 to increase visibility. One or more markers **87*a* may be a specific color to designate a water flow rate of a particular hydrant. For example, a blue marker may represent 1500 GPM or more, a green marker may represent 1000-1499 GPM, an orange marker may represent 500-999 GPM, and a red marker may represent flow rates below 500 GPM. One or more markers 87*b* may be reflective tape to aid users in spotting a hydrant particularly, but not limited to, at night or quickly in an emergency situation. Although the markers 87** are shown in detail, it should be understood to those skilled in the art that each marker may be of a variety of sizes, shapes, colors, quantities, orientations relative to the hydrant locking device, and constructions which may be used and still be within the scope of the teachings herein.

Hydrant locking device 110 may include one or more cavities (not shown) within housing 80, extension 140, or combinations thereof and be of a variety of constructions, shapes, quantities, sizes to hold a variety of devices such as, but is not limited to, one or more electronics 50. Similarly as described above, the electronics 50 may allow for a "mesh based sensor network" utilizing fire hydrants 1 for the placement of network nodes.

It is understood that while certain embodiments of the invention have been illustrated and described, it is not limited thereto except insofar as such limitations are included in the following claims and allowable functional equivalents thereof.

I claim:

1. A fire hydrant locking device for use on a hydrant operating nut comprising:

an extension having a first connector and a second connector, said extension having a staple post extending vertically from said extension, wherein said staple post is rotatably connected to said extension, said staple post includes a downward facing opening at a lower end of said staple post, one or more threaded bores intersect said downward facing opening of said staple post;

wherein said first connector is a actuator nut positioned at an upper end of said extension, wherein said actuator nut includes an upwardly extending pin, wherein said pin includes a circumferential groove, and wherein said staple post extends vertically from said actuator nut at said extension upper end and is disposed over said pin such that said downward facing opening of said staple post receives said pin, and one or more set screws extend inwardly within each of said one or more threaded bores of said staple post and inserts into said circumferential groove of said pin creating an interference fit between said set screw and said circumferential groove allowing said staple post to rotate relative to said actuator nut while limiting axial movement therebetween;

wherein said second connector includes a downwardly facing inner opening at a lower end of said extension, wherein said inner opening is a complementary shape corresponding to a standard hydrant operating nut, and a plurality of threaded bores intersect said inner opening wherein a set screw within each one of said plurality of threaded bores are designed to be operably tightened into a compressive engagement against said hydrant operating nut received within said inner opening;

a housing having a top opening therein, wherein said housing being capable of being disposed over said extension thereby said staple post extends through said top opening of said housing; and said housing interacting with said extension between a locked configuration and an unlocked configuration, wherein said housing may be axially removed from said extension when in said unlocked configuration, and wherein said housing rotates relative to said extension, said staple post rotates relative to said extension and said housing, and said housing may not be axially removed from said extension when said housing is in said locked configuration, and said housing is circumferentially disposed over both of said one or more set screws within said staple post and said set screws of said second connector when said housing is in said locked configuration to make inaccessible to unauthorized access.

2. The fire hydrant locking device of claim 1 wherein said staple post rotates about a longitudinal axis of said extension, wherein said longitudinal axis extends between said upper end and said lower end of said extension.

3. The fire hydrant locking device of claim 2 wherein each of said staple post and said housing rotates about said longitudinal axis of said extension.

4. The fire hydrant locking device of claim 1 wherein said locked configuration further includes a locking device engaging said staple post thereby limiting axial movement of said housing relative to said extension.

5. The fire hydrant locking device of claim 1 wherein said housing includes one or more markers on an outer periphery of said housing.

6. The fire hydrant locking device of claim 5 wherein said one or more markers indicate a hydrant flow rate, a reflector, or combinations of said hydrant flow rate and said reflector.

7. A fire hydrant locking device for use on a hydrant operating nut comprising:

a generally cylindrical extension having an upper end and a lower end relative to an longitudinal axis, said upper end includes an actuator nut with a pin extending from said actuator nut, wherein said pin includes a circumferential groove;

a rotatable staple post having a downward facing opening at a lower end of said staple post, one or more threaded bores intersect said downward facing opening of said staple post, wherein said staple post is disposed over said pin such that said downward facing opening of said staple post receives said pin, and one or more set screws extend inwardly within each of said one or more threaded bores of said staple post and inserts into said circumferential groove of said pin creating an interference fit between said set screw and said circumferential groove allowing said staple post to rotate relative to said actuator nut about said longitudinal axis while limiting axial movement therebetween;

wherein said lower end of said extension includes an inner opening with a plurality of bores intersecting said inner opening, wherein a plurality of set screws threadably engage said plurality of bores to travel into and out of said inner opening;

a housing having a top wall with a depending cylindrical skirt, wherein said top wall includes an opening, and a cylindrical neck portion extending upwardly from said top wall and further defining said opening; and said housing rotatably engages said extension, said housing being rotatable about said longitudinal axis when assembled on said extension of said housing, wherein said top wall opening receives said rotatable staple post of said extension and said rotatable staple post rotates about said longitudinal axis relative to each one of said housing and said extension, and said cylindrical neck portion is circumferentially disposed over said one or more set screws of said staple post when said depending cylindrical skirt is circumferentially disposed over said plurality of set screws of said lower end of said extension.

8. The fire hydrant locking device of claim 7 further comprising a locking device engaging said rotatable staple post, said locking device limits vertical movement between said extension and said housing.

9. The fire hydrant locking device of claim 8 wherein said locking device is tamper evident.

10. The fire hydrant locking device of claim 7 wherein said housing and said staple post rotate independently of each other.

11. The fire hydrant locking device of claim 7 wherein said actuator nut of said extension is capable of being engaged by a tool and said lower end of said extension fixedly engages to a hydrant operating nut.

12. The fire hydrant locking device of claim 7 wherein said rotatable staple post includes an aperture therethrough.

13. The fire hydrant locking device of claim 7 wherein said housing includes one or more visual markers, wherein said one or more visual markers are each placed 360 degrees about said depending cylindrical skirt of said housing.

* * * * *